United States Patent Office 3,257,269
Patented June 21, 1966

3,257,269
CUPROUS CYANIDE-ALKYL THIOETHER OR DITHIOETHER ADDITION PRODUCTS AS INSECTIDES
Paul F. Warner, Phillips, and Bradford L. Archer and Richard D. Franz, Borger, Tex., assignors to Phillips Petroleum Company, a corporation of Delaware
No Drawing. Original application Aug. 14, 1959, Ser. No. 833,697, now Patent No. 3,064,025, dated Nov. 13, 1962. Divided and this application Mar. 2, 1962, Ser. No. 176,893
4 Claims. (Cl. 167—22)

This invention relates to the control or killing of insects. In one of its aspects, it relates to a method in which addition compounds of a heavy metal cyanide and an alkyl thioether or an alkyl dithioether are used for destroying insects such as grasshoppers and cockroaches.

This application is a divisional of Serial Number 833,697, filed by us August 14, 1959, now Patent No. 3,064,025, issued November 13, 1962.

The cuprous cyanide addition compounds of di-n-butyl sulfide and 2,5-dithiahexane have been prepared by adding the cyanide to the thioether. The additions have been made at room temperature. The cuprous n-butyl sulfonium cyanide is a viscous oil with a greenish tint and the 2,5-dithiahexane-cuprous cyanide product is a white powder. It is an object of the invention to provide an insecticide for killing insects such as grasshoppers and cockroaches. It is a further object of this invention to provide a method for killing insects such as grasshoppers and cockroaches.

Other aspects, objects and the several advantages of the invention are apparent from the present disclosure and the appended claims.

The alkyl thioethers and the alkyl dithioethers, as exemplified by di-n-butyl sulfide and 2,5-dithiahexane, respectively, which are included within the scope of the present invention, are those which contain 1 to 12 carbon atoms in the alkyl group. The alkyl group can be a primary, secondary, or tertiary alkyl group. The dithioethers which contain sulfur attached to terminal carbon atoms, as in 2,5-dithiahexane, are now preferred.

The preparation of the compounds used in this invention is set forth in more detail and claimed in said Patent No. 3,064,025, which issued November 13, 1962.

According to the present invention, there is provided a method of killing insects which comprises applying to the insect an addition product of the invention.

EXAMPLE I

*Insecticide tests.*—The following tabulations show the insecticidal properties of 2,5-dithiahexane-cuprous cyanide and cuprous di-n-butyl sulfonium cyanide:

Table 1

| Compound | Concentration Applied, Wt. Percent | Percent Dead | |
|---|---|---|---|
| | | Grasshoppers,[1] 2 Days | Cockroaches, 2 Days |
| 2,5-dithiahexane-CuCN | 0.2 [2] | 100 | 90 |
| | Powder [3] | 75 | 80 |
| Control Insects | | 60 | 0 |

[1] Average of two separate tests of 10 grasshoppers each.
[2] The meaning of "0.2" and "1.0" in the column labeled "concentration applied, wt. percent" means the insecticide was emulsified in water to the specified concentration. A 0.2 weight percent application would correspond to 0.2 gram of insecticide being emulsified in 99.8 grams of water and emulsifier. Tritons X-151 and X-171 were used for 2,5-dithiahexane-CuCN addition product and Triton X-171 was used for cuprous n-butyl sulfonium cyanide. Water was used as the carrier in all of our tests. Other emulsifiers can be used, if desired, in lieu of those here mentioned.
[3] The term "powder" means the insecticide, without carrier, was sprinkled into the container containing the insects. The insects' food, as well as they themselves, came into contact with the powder. Approximately 1.0 gram of insecticide, in powder form, was used in the tests.
NOTE.—The mortality rate for the cockroach control was nil.

Table 2

| Compound | Concentration Applied, Wt. Percent | Percent Dead Grasshoppers,[1] 2 Days |
|---|---|---|
| Cuprous di-n-butyl sulfonium cyanide | [2] 1.0 | 90 |
| Control Insects | | 50 |

[1] See footnote 1, Table 1.
[2] See footnote 2, Table 1.

In the insecticide tests, the grasshoppers and cockroaches were placed in the same type containers but the control insects were without the insecticide. The containers used in the insect tests were cardboard quart boxes with one side cut away and covered with screen wire. Ten grasshoppers were placed in each container. Grass and a small tree branch were added to provide food and perching space for the grasshoppers. Fresh grass was added each day during the test. Large beakers (1000 cc.) were used in the cockroach tests. A thin layer of Vaseline was applied near the top of the beaker to prevent the roaches from escaping. Ten cockroaches were placed in each beaker. A small portion of cat food was also placed in each beaker as food for the roaches. The compounds to be tested were applied as emulsions in water, sprayed directly into the container wetting the insects and container walls as well as the grass and cat food. One container of insects was left unsprayed as a control for each run.

The following tabulation gives the results of a series of tests on the insecticidal properties of 2,5-dithiahexane-cuprous cyanide addition compound and cuprous n-butyl sulfonium cyanide. These tests were run to determine whether the control mortality rate for grasshoppers could be lowered while still obtaining the high mortality rate for the insecticide.

Table 3

| Compound | Concentration Applied, Wt. Percent | Percent Killed | | | |
|---|---|---|---|---|---|
| | | Grasshoppers | | Cockroaches | |
| | | 1 day | 2 days | 1 day | 2 days |
| 2,5-dithiahexane-CuCN | 0.2 | 40 | 100 | 60 | 90 |
| | Powder (100%) | 30 | 80 | 20 | 80 |
| Control | | 0 | 30 | 0 | 0 |
| Cuprous n-butyl sulfonium cyanide | 1.0 | 30 | 90 | | |
| | 0.5 | 10 | 60 | 40 | 40 |
| Control | | 0 | 40 | 0 | 0 |

As is seen, the control mortality rates for grasshoppers are substantially lower than those in the earlier tables of this example. The high mortality rate of the treated insecticides was about the same as before. The mortality rate for the cockroach control was nil. A concentration of 1.0 weight percent is now preferred for satisfactory kill power under most ordinary conditions.

The heavy metals, the cyanides of which are to be included when considering this disclosure are: copper, zinc, silver, gold, mercury, lead, cadmium, nickel, cobalt, palladium, platinum and barium.

The compounds now preferred to be used in method of the invention include the 2,5-dithiahexane-cuprous cyanide addition product and cuprous di-n-butyl sulfonium cyanide.

Reasonable variation and modification are possible within the scope of the foregoing disclosure and the appended claims to the invention, the essence of which is that there have been provided a composition and a method for control or killing of insects such as grasshoppers and roaches, the composition comprising an effective amount upon application of a heavy metal cyanide addition product of an alkyl thioether and/or an alkyl dithioether, as described.

We claim:
1. A method of killing an insect which comprises applying thereto an addition product of cuprous cyanide and a compound selected from the group consisting of alkyl thioethers and alkyl dithioethers in which any alkyl group contains 1–12 carbon atoms.
2. A method for killing a cockroach which comprises applying thereto an addition product of cuprous cyanide and a compound selected from the group consisting of alkyl thioethers and alkyl dithioethers in which any alkyl group contains 1–12 carbon atoms.
3. A method for killing an insect which comprises applying an insecticidal amount of 2,5-dithiahexane-cuprous cyanide addition product to said insect.
4. A method of killing an insect which comprises applying an effective amount of cuprous-n-butyl sulfonium cyanide to said insect.

References Cited by the Examiner
UNITED STATES PATENTS

| | | | |
|---|---|---|---|
| 2,998,346 | 8/1961 | Scott et al. | 167—22 |
| 3,017,320 | 1/1962 | Franz et al. | 167—22 |

OTHER REFERENCES

Frear, D.E.H.: 3rd edition, New York, Van Nostrand Co., 1955, SB951F7, note especially page 280.

JULIAN S. LEVITT, *Primary Examiner.*

FRANK CACCIAPAGLIA, JR., *Examiner.*